US010152220B2

(12) United States Patent
Yuan (10) Patent No.: US 10,152,220 B2
(45) Date of Patent: *Dec. 11, 2018

(54) SYSTEM AND METHOD TO CONTROL A TOUCHSCREEN USER INTERFACE

(71) Applicant: Intel Corporation, Santa Clara, CA (US)

(72) Inventor: Kaining Yuan, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/677,872

(22) Filed: Aug. 15, 2017

(65) Prior Publication Data

US 2018/0188919 A1 Jul. 5, 2018

Related U.S. Application Data

(63) Continuation of application No. 14/431,478, filed as application No. PCT/CN2014/074185 on Mar. 27, 2014, now Pat. No. 9,740,397.

(51) Int. Cl.
*G06F 3/0488* (2013.01)
*G06F 3/041* (2006.01)
*G06F 3/0484* (2013.01)

(52) U.S. Cl.
CPC .......... *G06F 3/0488* (2013.01); *G06F 3/0416* (2013.01); *G06F 3/0484* (2013.01); *G06F 3/04883* (2013.01); *G06F 2203/04108* (2013.01)

(58) Field of Classification Search
CPC ..... G06F 3/041–3/047; G06F 3/048–3/04897; G06F 2203/04101; G06F 2203/04108
(Continued)

(56) References Cited

U.S. PATENT DOCUMENTS 9,740,397 B2 8/2017 Yuan et al.
2010/0245287 A1* 9/2010 Thorn ................ H04N 5/23219
345/175

(Continued)

FOREIGN PATENT DOCUMENTS

CN 103246476 A 8/2013
CN 103513881 A 1/2014
(Continued)

OTHER PUBLICATIONS

"U.S. Appl. No. 14/431,478, Non Final Office Action dated Jun. 14, 2016", 10 pgs.
(Continued)

*Primary Examiner* — Michael Pervan
(74) *Attorney, Agent, or Firm* — Schwegman Lundberg & Woessner, P.A.

(57) ABSTRACT

Various systems and methods for controlling a touchscreen user interface are described herein. A system to comprises a proximity sensor; a touchscreen; a proximity sensor driver to interface with the proximity sensor; a touch sensor driver to interface with the touchscreen; and a user interface manager module to: receive an event signal indicating that a user interface action has been initiated; access a delay timer for the user interface action, the delay timer set based on events received by at least one of: the proximity sensor driver or the touch sensor driver; and execute the user interface action when the delay timer is expired.

20 Claims, 5 Drawing Sheets

(58) Field of Classification Search
USPC ............... 178/18.01–19.07; 345/173–178;
715/700–866
See application file for complete search history.

(56) References Cited

U.S. PATENT DOCUMENTS

| 2013/0201113 A1* | 8/2013 | Hinckley | G06F 3/0487 |
| | | | 345/173 |
| 2014/0085227 A1* | 3/2014 | Alexandersson | G06F 1/1694 |
| | | | 345/173 |
| 2016/0110051 A1 | 4/2016 | Yuan | |

FOREIGN PATENT DOCUMENTS

| CN | 103677403 A | 3/2014 |
| WO | WO-2011008603 A1 | 1/2011 |
| WO | WO-2013120537 A1 | 8/2013 |
| WO | WO-2015143665 A1 | 10/2015 |

OTHER PUBLICATIONS

"U.S. Appl. No. 14/431,478, Non Final Office Action dated Dec. 12, 2016", 9 pgs.
"U.S. Appl. No. 14/431,478, Notice of Allowance dated Apr. 19, 2017", 8 pgs.
"U.S. Appl. No. 14/431,478, Response filed Feb. 28, 2017 to Non Final Office Action dated Dec. 12, 2016", 13 pgs.
"U.S. Appl. No. 14/431,478, Response filed Sep. 14, 2016 to Non Final Office Action dated Jun. 14, 2016", 12 pgs.
"International Application Serial No. PCT/CN2014/074185, International Search Report dated Dec. 31, 2014", 4 pgs.
"International Application Serial No. PCT/CN2014/074185, Written Opinion dated Dec. 31, 2014", 4 pgs.

* cited by examiner

SYSTEM AND METHOD TO CONTROL A TOUCHSCREEN USER INTERFACE

PRIORITY APPLICATIONS

This application is a continuation of U.S. application Ser. No. 14/431,478, filed Mar. 26, 2015, which is a U.S. National Stage Application under 35 U.S.C. 371 from International Application No. PCT/CN2014/074185, filed Mar. 27, 2014, published as WO 2015/143665, all of which are hereby incorporated by reference in their entirety.

TECHNICAL FIELD

Embodiments described herein generally relate to mobile devices and in particular, to systems and methods to control a touchscreen user interface.

BACKGROUND

Many electronic devices include a touchscreen for user input. A touchscreen is an electronic visual display that the user may interact with using single or multi-touch gestures. The user may use their fingers, a stylus, a pen, or other apparatus to touch the touchscreen and cause an input contact point to be detected on the touchscreen.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Touchscreens may be found on many different types of electronic devices including game consoles, mobile phones, tablet computers, hybrid computers, personal digital assistants, kiosks, and the like. Modern mobile devices may rotate the screen orientation by measuring the relative direction to the outer environment (e.g., rotational acceleration, gravity direction, or human face direction, among others). Normally the orientation change is caused by clear user behavior. e.g. rotating the device. But sometimes there can be a vague state where the device and screen orientation is neither clearly vertical nor horizontal. The device may be at the tipping point to rotate the screen from one orientation to another. At that time, if user is about to tap the screen and the device moves enough at the tipping point, the user may inadvertently tap the screen, rotating the user interface, and causing the tap to be rendered invalid, ignored, or activate an unintended function. In the whole process, the user may not be aware that they are holding the device in such a position—the holding hand may just move a little bit, and without their knowledge, the screen rotates and ignores their tap or processes it incorrectly. This is illustrated in FIGS. 1A-1B.

Figure 1A:
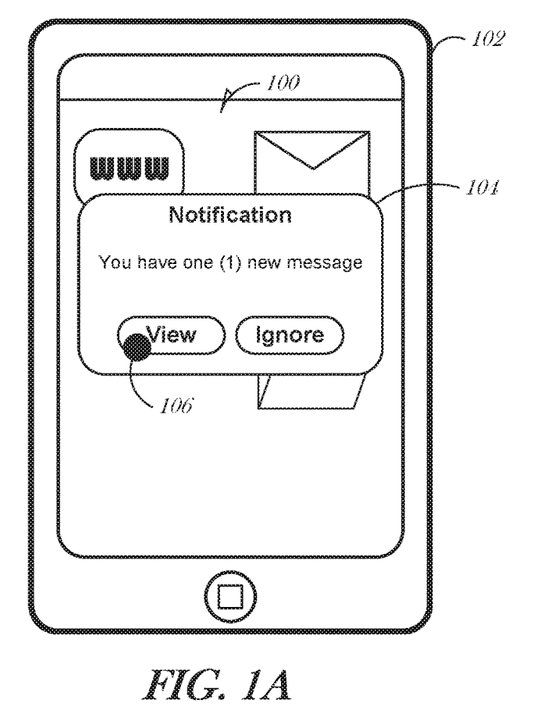
FIGS. 1A-1B illustrate screenshots of a user interface of a mobile device.
Figure 1B:
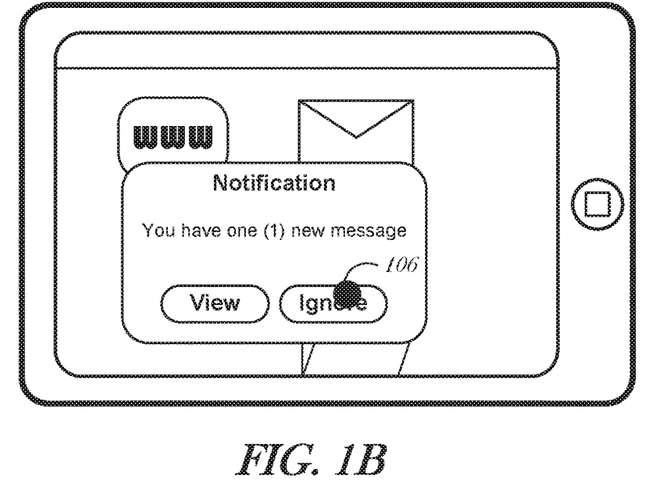

FIGS. 1A-1B illustrate screenshots of a user interface 100 of a mobile device 102. In FIG. 1A, a notification dialog box 104 is displayed on a touchscreen to a user. The user taps the contact point 106, intending to view the new message identified in the notification dialog box 104. However, the user was holding the mobile device 102 at an angle close to a threshold position where the user interface 100 transitions from a portrait orientation (as illustrated in FIG. 1A) to a landscape orientation (as illustrated in FIG. 1B). Just before the user is able to tap the touchscreen, the user inadvertently moves and the user interface 100 transitions to the landscape mode (FIG. 1B). When the user does touch the touchscreen, instead of activating the "View" control of the notification dialog box 104, the user instead activates the "Ignore" control and dismisses the notification dialog box 104. While ignoring the message instead of viewing it may not have significant consequences, one may appreciate that in other contexts, a user input error caused by this behavior may have dire consequences.

Besides the screen rotation, other user interface functions may cause similar problems. For example, some user interfaces automatically show or hide user interface controls, such as dialog boxes, contextual menus, alerts, or the like. An application or the operating system may display a user interface control and then after a predefined timeout period, hide the user interface control. If the user is about to tap a user interface control just before the expiration of the timeout period, and then the timeout period expires before the actual tap, the user may activate a user interface object that was behind the previously-displayed user interface control. This may cause unintended results or user frustration.

In general, when there is an automatic software action without user's full awareness, and when the action is performed almost simultaneously with a user's touch input, the automatic software action may miss the user's touch input or alter the consequence of the user's touch input (to something other than user's original intention).

By using a proximity sensor to detect an approaching finger (or pen or stylus), a software application or the operating system may delay the user interface function to ensure that the user's input is received to cause the operation intended by the user. The automatic user interface action may be taken later, after the input is idle, such as after the user lifts their finger away from the touchscreen for a certain period of time.

Returning to FIGS. 1A-1B, if a proximity sensor is used to detect the approaching finger, then the screen orientation flip may be delayed until the touch input is received and processed. In this case, the user's intended touch of the "View" control would be registered as originally intended by the user. After the message is displayed, then the user interface may flip to the landscape orientation (e.g., FIG. 1B).

Similar situations may occur when a user touches a touchscreen and an automatic user interface function executes. For example, a user may be touching a contact point on the touchscreen to select a region or activate a control. If the underlying content changes, such as by an auto-scroll or a screen rotation, then the user may inadvertently select a different region than was intended or activate (or fail to activate) an unintended control. Thus, to maintain a consistent user experience, the automatic user interface function may be delayed for a period while the user is in contact with the touchscreen. Such mechanisms may be extended to periods where there are multiple touches in a short timeframe. For example, when a user is typing on a virtual keyboard and inadvertently changes the device's orientation, it may create annoyance or erroneous input if the keyboard were to change orientation in the user interface. Thus, for a time period while there is frequent input, such as when the user is typing, the user interface activity may be delayed. This may be implemented with an increasing delay. For example, on the first touch, the delay may be set at 100 ms, then after the second touch, the delay may be increased to 300 ms, and after the third touch, the delay may be increased to 1000 ms. A maximum setting may be implemented, for example, where the delay is not increased past 1000 ms. It is understood that any delay period may be used and that any increasing amount may be used when implementing a stepped delay.

Figure 2:
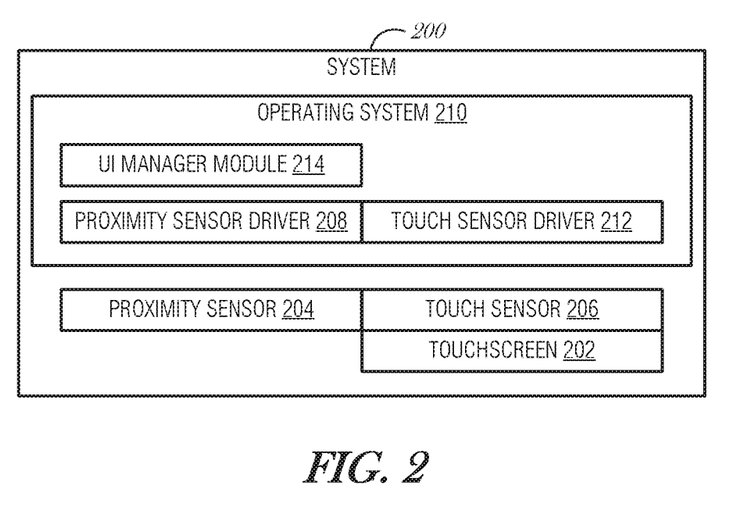
FIG. 2 is a block diagram illustrating a system architecture, according to an example embodiment.

FIG. 2 is a block diagram illustrating a system architecture, according to an example embodiment. At the physical device layer, a system 200 may include a touchscreen 202 as an input device. The system 200 may also include a proximity sensor 204 and a touch sensor 206. The proximity sensor 204 or the touch sensor 206 may be incorporated into the touchscreen 202. The touch sensor 206 may be the touchscreen 202 itself and may be implemented with a threshold to detect a nearby hovering object among other capacitive noise. When an object, such as a finger or stylus, is near the touchscreen 202 (e.g., within a threshold distance), the proximity sensor 204 detects the object and sends an interrupt to a proximity sensor driver 208. The proximity sensor driver 208 acts as an interface between the hardware layer (e.g., proximity sensor 204) and an operating system 210. Similarly, when a touch is sensed on the touchscreen 202, the touch sensor 206 generates an interrupt, which is detected by the touch sensor driver 212. The touch sensor driver 212 acts as the interface between the touch sensor 206 and the operating system 210.

A user interface (UI) manager module 214 is executed either within the operating system 210 (e.g., as a system task in system memory) or over the operating system 210 (e.g., as an application in application memory). The UI manager module 214 is used to register certain user interface activities and maintain a delay timer for the registered user interface activities.

In operation, a software application or a user may configure the UI manager module 214 with one or more user interface activities to monitor. The user interface activities are ones that may interrupt, confuse, or cause potential user input errors. Examples of user interface activities include but are not limited to a screen rotation, an auto-hide, or an auto-scroll.

Screen rotations are when the user interface is re-oriented from portrait to landscape or vice versa after the device has been moved past some threshold position. Screen rotations may cause erroneous input if they occur just as the user is about to touch a certain point on the touchscreen 202.

Auto-hide functions may be used to automatically hide a user interface element, such as a dialog box, an alert, a contextual menu, or an informational pop-up, after some timeout period. For example, after beginning a software download, a pop-up screen may provide the user a short time to cancel the action in a dialog box. The dialog box may disappear after a timeout of five seconds. If the user is moving to touch the cancel control, the dialog box may disappear just as the user is about to touch the control.

Auto-scroll functions act to automatically scroll content on the touchscreen 202. Auto-scroll functions may be implemented in documents, web pages, electronic books, or the like. As with the other types of automatic functions, if a user is about to interact with a user interface object just as the interface auto-scrolls the content, an erroneous input may occur.

One or more user interface actions may be registered with the UI manager module 214 such that when the user interface action occurs, the UI manager module 214 traps the event message and delays the event message for a time until a delay timer expires, and then broadcasts or transmits the event message to the operating system 210 or other applications executing on the operating system 210. For example, a user or an application may register the user interface action of a screen rotation with the UI manager module 214. The UI manager module 214 then creates a delay timer if one does not already exist for this type of action. The UI manager module 214 then initializes the delay timer to some default value. The default value may be a relatively short period—such as 100 milliseconds, a multiple of 10 milliseconds, etc.—so that the user does not observe a lag in the user interface's response time. When a screen rotation activity is triggered, such as when the device is physically moved from one orientation to another orientation, the proximity sensor 204 and/or the touch sensor 206 determine whether an object is proximate to the touchscreen 202 or touching the touchscreen 202, respectively. If there is an object near or contacting the touchscreen, the proximity sensor driver 208 and/or the touch sensor driver 212 initiates an event, which is trapped by the UI manager module 214. The UI manager module 214 then increases the delay timer for any registered user interface actions. The UI manager module 214 traps the screen rotation activity for the delay period, which may be increased by events from one or both of the proximity sensor driver 208 or the touch sensor driver 212, and then after the delay period expires, releases the user interface action (e.g., broadcasts the system event).

Thus, FIG. 2 illustrates a system 200 for controlling a touchscreen user interface, the system comprising: a proximity sensor 204, a touchscreen 202, a proximity sensor driver 208 to interface with the proximity sensor 204, a touch sensor driver 212 to interface with the touchscreen 202; and a user interface manager module 214 to: receive an event signal indicating that a user interface action has been initiated; access a delay timer for the user interface action, the delay timer set based on events received by at least one of: the proximity sensor driver or the touch sensor driver; and execute the user interface action when the delay timer is expired.

In an embodiment, to set the delay timer, the proximity sensor driver 208 is to: receive a signal from a proximity sensor 204, the signal indicating that an object is proximate to a touchscreen 202 of the system; and send the event signal to the user interface manager module indicating that the object is proximate to the touchscreen, the event signal causing the user interface module to set the delay timer to a default value. In an embodiment, the default value is 100 milliseconds. The default value may be configured by the user.

In an embodiment, the proximity sensor driver 208 is to: receive a second signal from the proximity sensor 204, the second signal indicating that the object is still proximate to the touchscreen 202; and send the event signal to the user interface manager module indicating that the object is still proximate to the touchscreen, the event signal causing the user interface module to increase the delay timer. Each time the proximity sensor 204 detects a proximate object, the delay timer may be increased by successively larger amounts. There may be a maximum value for the delay timer.

When a user holds a mobile device, such as a smartphone, the hand holding the device may wrap around the edges of the screen such that one or more fingers may be close to or touching the screen. In order to avoid a false positive, the proximity sensor driver 208 may filter touches that are near the screen edge (e.g., within 1 cm from the edge). In an embodiment, to set the delay timer, the proximity sensor driver 208 is to: determine whether a distance from the object to the touchscreen 202 is less than a preset value; determine whether a location of the object is away from a screen edge of the touchscreen 202; and when the distance is less than the preset value and the location is away from the screen edge, send the event signal to the user interface manager module indicating that the distance of the object is less than the preset value and the location is away from the screen edge, the event signal causing the user interface module to set the delay timer.

In an embodiment, the proximity sensor 204 is incorporated into the touchscreen 202. In various embodiments, the proximity sensor 204 is one of an electrical sensor, an optical sensor, a magnetic sensor, or a sonar sensor. Electrical sensors may be inductive or capacitive. Optical sensors may be infrared or laser based.

In an embodiment, to set the delay timer, the touch sensor driver 212 is to: receive a signal from a touch sensor 206, the signal indicating that an object is touching a touchscreen 202 at a contact point; and send the event signal to the user interface manager module indicating that the object is touching the touchscreen at the contact point, the event signal causing the user interface module to set the delay timer to a default value. In an embodiment, the default value is 100 milliseconds.

In an embodiment, the touch sensor driver 212 is to: receive a second signal from the touch sensor 206, the second signal indicating that the object is still touching the touchscreen 202; and send the event signal to the user interface manager module indicating that the object is still touching the touchscreen, the event signal causing the user interface module to increase the delay timer. The delay timer may be increased by larger amounts up to a maximum value.

Similar to the proximity detection, the touch sensor driver 212 may filter touches to avoid false positives. In order to avoid a false positive, the touch sensor driver 212 may filter touches that are near the screen edge (e.g., within 1 cm from the edge). In an embodiment, to set the delay timer, the touch sensor driver 212 is to: determine whether a location of the contact point is away from a screen edge of the touchscreen 202; and when the location is away from the screen edge, send the event signal to the user interface manager module indicating that location of the contact point is away from the screen edge of the touchscreen, the event signal causing the user interface module to set the delay timer. To be considered away from the screen edge, a threshold distance may be used. The threshold distance may be configurable by an administrative user or may be set by the manufacturer of the touch sensor driver 206 or the touch sensor 206.

In various embodiments, the user interface action is one of a screen rotation, an auto-hide function, or an auto-scroll function. It is understood that other user interface actions may be monitored, trapped, and delayed.

Figure 3:
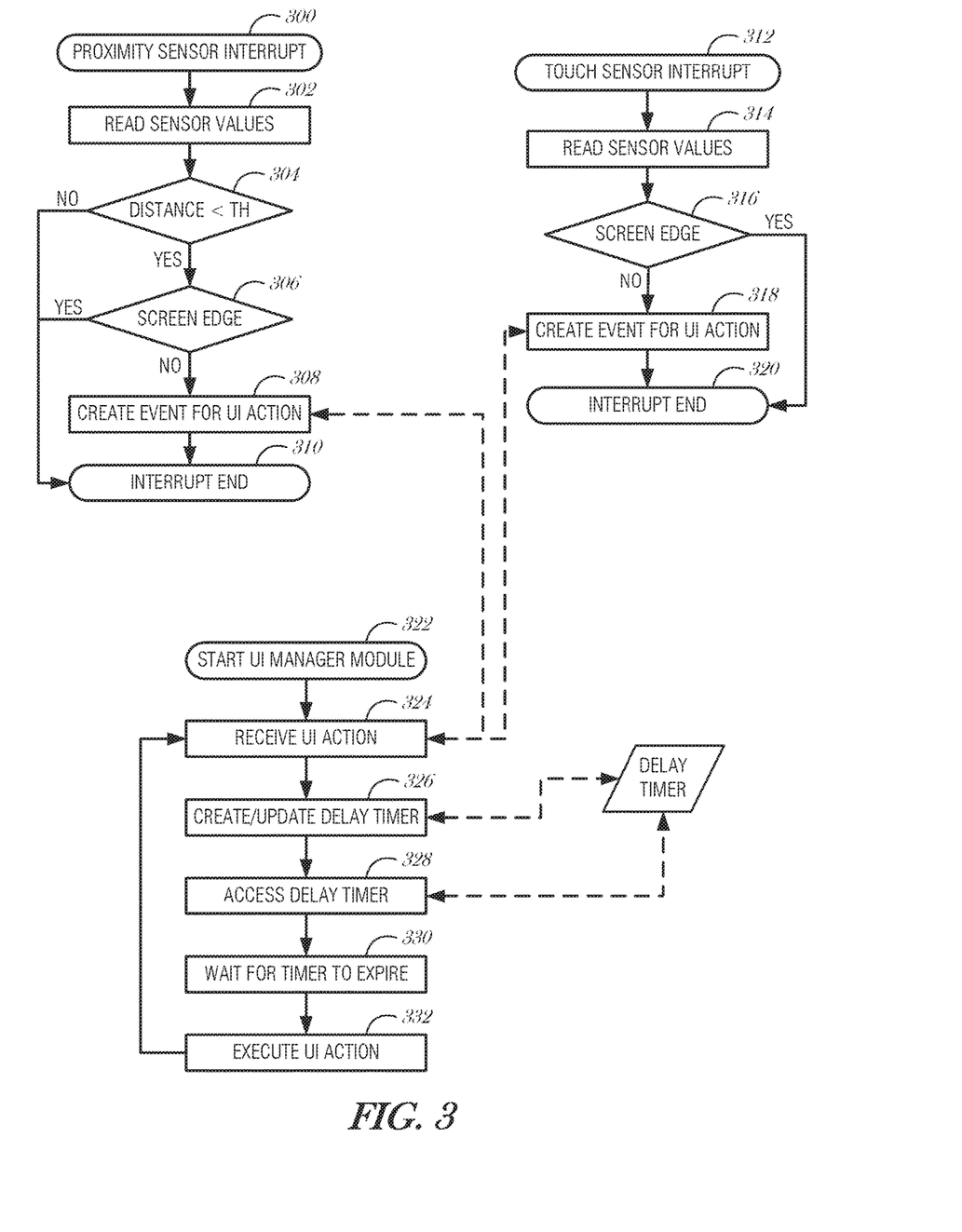
FIG. 3 is a flowchart illustrating the interaction between a proximity sensor driver, a touch sensor driver, and a user interface manager module, according to an embodiment.

FIG. 3 is a flowchart illustrating the interaction between a proximity sensor driver, a touch sensor driver, and a user interface manager module, according to an embodiment. At block 300, a proximity sensor interrupt is generated from a proximity sensor. The proximity sensor interrupt may be handled by various hardware or software mechanisms. In the example illustrated in FIG. 3, the proximity sensor interrupt is handled by a proximity sensor driver. The proximity sensor interrupt indicates that an object is within a certain proximity to the proximity sensor. At block 302, the proximity sensor driver reads the sensor values. The sensor values may be stored temporarily in one or more registers. At decision block 304, the proximity sensor driver determines whether the distance that the object is from the proximity sensor is less than a threshold value. If the distance is not less than the threshold value, then the interrupt handling ends at block 310. Alternatively, if the distance is less than the threshold value, then the control flow moves to decision block 306, where it is determined whether the object is near a screen edge. This is used to filter false positives, such as when a user is grasping the device and the grasping hand's fingers are near the screen edge. Again, if the object is near the screen edge, then the interrupt handling ends at block 310. Alternatively, if the object is within the threshold distance and not near a screen edge, then an event is created for the user interface action at block 308.

At block 312, a touch sensor interrupt is generated from a touch sensor. The touch sensor interrupt indicates that a touch has occurred. At block 314, the touch sensor driver reads the sensor values. The sensor values may be stored temporarily in one or more registers. At decision block 316, the touch sensor driver determines whether the touch is near the screen edge. If so, then the interrupt handling ends at block 320. This acts as a filter to ignore touches that may have occurred inadvertently from a user's hand that is holding the device. If the touch is not near the screen edge, then an event is created for the UI action at 318.

The user interface manager module is initiated at block 322. At block 324, the UI manager module receives a UI action. The UI action may be a screen rotation, auto-hide, or auto-scroll function. The UI manager module may intercept an event broadcasted from the proximity sensor driver or the touch sensor driver based on values received by a proximity sensor or touch sensor, respectively. At block 326, a delay timer is created or updated. If a delay timer does not exist, then the delay timer is created with a default value. If the delay timer does exist, then the delay timer may be increased by some value. At block 328, the UI interface manager accesses a delay timer, which is set to a value based on events received by one or both of the proximity sensor driver or the touch sensor driver. After the delay timer expires (block 330), then the UI manager module executes the UI action (block 332).

Figure 4:
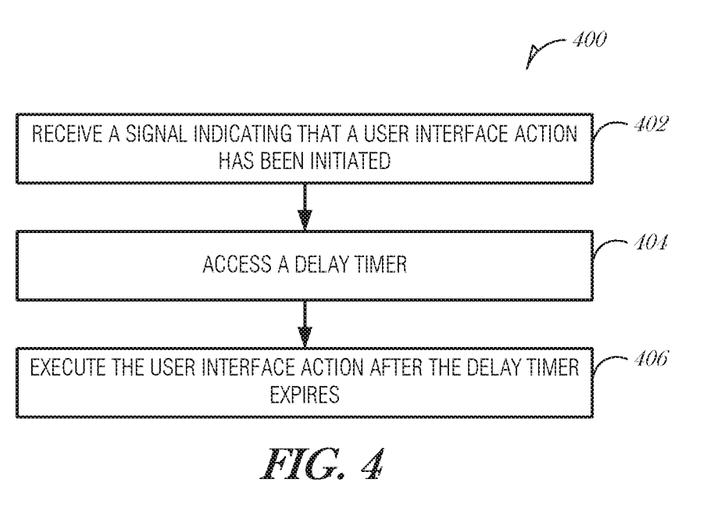
FIG. 4 is a flowchart illustrating a process of controlling a touchscreen user interface, according to an embodiment.

FIG. 4 is a flowchart illustrating a process 400 of controlling a touchscreen user interface, according to an embodiment. At block 402 an event signal indicating that a user interface action has been initiated is received at a mobile device. In various embodiments, the user interface action is one of a screen rotation, an auto-hide function, or an auto-scroll function.

At block 404, a delay timer for the user interface action is accessed. The delay timer may be set by at least one of: a proximity sensor driver or a touch sensor driver.

In an embodiment, setting the delay timer by the proximity sensor driver comprises receiving a signal from a proximity sensor, the signal indicating that an object is proximate to a touchscreen of the mobile device and sending the event signal to set the delay timer to a default value. In an embodiment, the default value is 100 milliseconds. In a further embodiment, the method 400 includes receiving a second signal from the proximity sensor, the second signal indicating that the object is still proximate to the touchscreen and sending the event signal to increase the delay timer.

In an embodiment, setting the delay timer by the proximity sensor driver comprises: determining whether a distance from the object to the touchscreen is less than a preset value; determining whether a location of the object is away from a screen edge of the touchscreen; and when the distance is less than the preset value and the location is away from the screen edge, sending the event signal to set the delay timer.

In an embodiment, the proximity sensor is the touchscreen. In various embodiments, the proximity sensor is one of an electrical sensor, an optical sensor, a magnetic sensor, or a sonar sensor.

In an embodiment, setting the delay timer by the touch sensor driver comprises receiving a signal from a touch sensor, the signal indicating that an object is touching a touchscreen of the mobile device at a contact point and sending the event signal to set the delay timer to a default value. In an embodiment, the default value is 100 milliseconds. In a further embodiment, the method includes receiving a second signal from the touch sensor, the second signal indicating that the object is still touching the touchscreen and sending the event signal to increase the delay timer.

In an embodiment, setting the delay timer by the touch sensor driver comprises determining whether a location of the contact point is away from a screen edge of the touchscreen and when the location is away from the screen edge, sending the event signal to set the delay timer.

At block 406, the user interface action is executed when the delay timer is expired. One mechanism to execute the user interface action is to broadcast an event message to be received by the operating system or an application executing on the operating system.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 5:
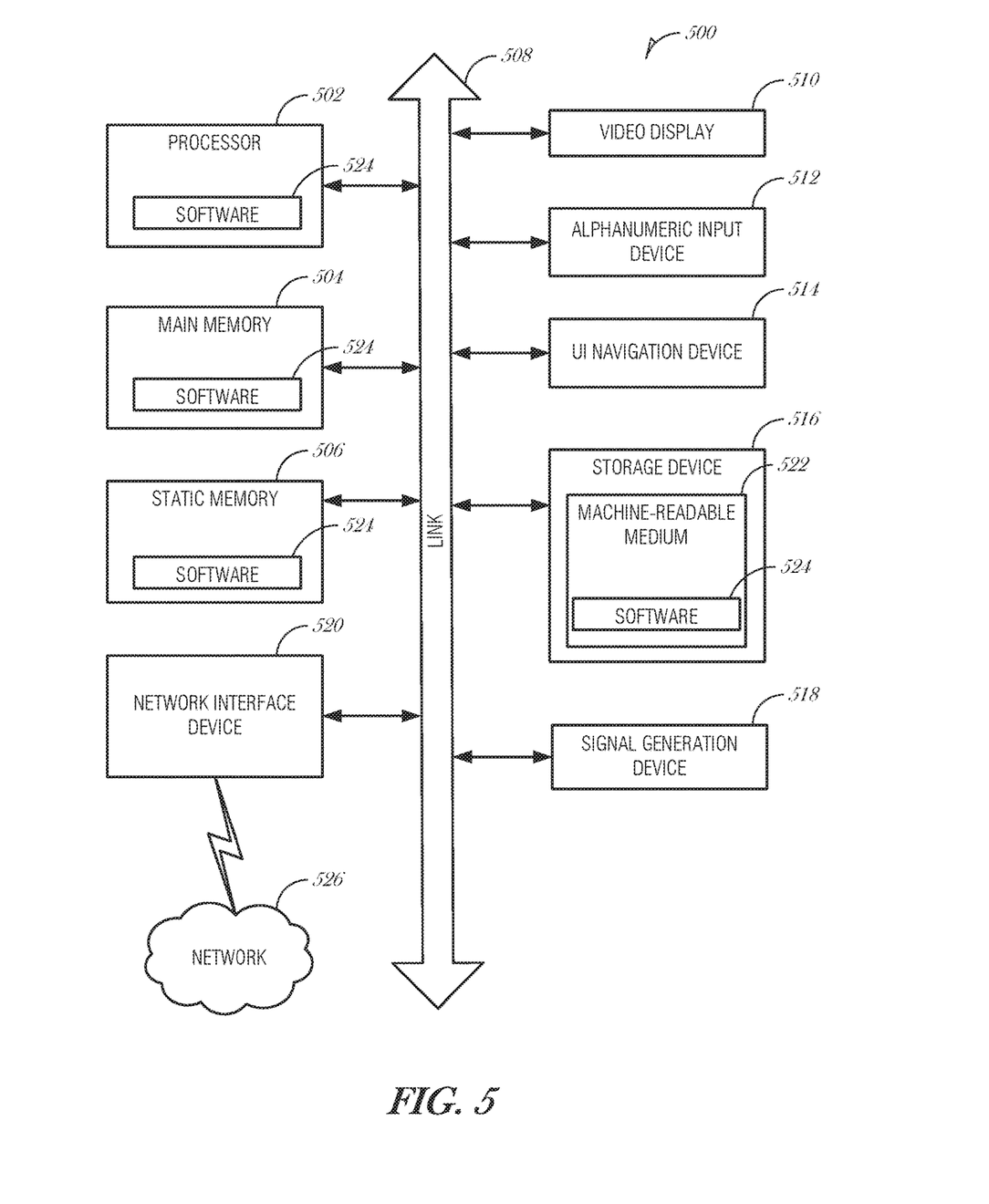
FIG. 5 is a block diagram illustrating an example machine upon which any one or more of the techniques (e.g., methodologies) discussed herein may perform, according to an example embodiment.

FIG. 5 is a block diagram illustrating a machine in the example form of a computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 may further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples

Example 1 includes subject matter for controlling a touchscreen user interface (such as a device, apparatus, or machine) comprising a system comprising a proximity sensor; a touchscreen; a proximity sensor driver to interface with the proximity sensor; a touch sensor driver to interface with the touchscreen; and a user interface manager module to: receive an event signal indicating that a user interface action has been initiated; access a delay timer for the user interface action, the delay timer set based on events received by at least one of: the proximity sensor driver or the touch sensor driver; and execute the user interface action when the delay timer is expired.

In Example 2, the subject matter of Example 1 may include, wherein to set the delay timer, the proximity sensor driver is to: receive a signal from a proximity sensor, the signal indicating that an object is proximate to a touchscreen; and send the event signal to the user interface manager module indicating that the object is proximate to the touchscreen, the event signal causing the user interface module to set the delay timer to a default value.

In Example 3, the subject matter of any one or more of Examples 1 to 2 may include, wherein the default value is 100 milliseconds.

In Example 4, the subject matter of any one or more of Examples 1 to 3 may include, wherein the proximity sensor driver is to: receive a second signal from the proximity sensor, the second signal indicating that the object is still proximate to the touchscreen; and send the event signal to the user interface manager module indicating that the object is still proximate to the touchscreen, the event signal causing the user interface module to increase the delay timer.

In Example 5, the subject matter of any one or more of Examples 1 to 4 may include, wherein to set the delay timer, the proximity sensor driver is to: determine whether a distance from the object to the touchscreen is less than a preset value; determine whether a location of the object is away from a screen edge of the touchscreen; and when the distance is less than the preset value and the location is away from the screen edge, send the event signal to the user interface manager module indicating that the distance of the object is less than the preset value and the location is away from the screen edge, the event signal causing the user interface module to set the delay timer.

In Example 6, the subject matter of any one or more of Examples 1 to 5 may include, wherein the proximity sensor is incorporated into the touchscreen.

In Example 7, the subject matter of any one or more of Examples 1 to 6 may include, wherein the proximity sensor is one of an electrical sensor, an optical sensor, a magnetic sensor, or a sonar sensor.

In Example 8, the subject matter of any one or more of Examples 1 to 7 may include, wherein to set the delay timer, the touch sensor driver is to: receive a signal from a touch sensor, the signal indicating that an object is touching a touchscreen at a contact point; and send the event signal to the user interface manager module indicating that the object is touching the touchscreen at the contact point, the event signal causing the user interface module to set the delay timer to a default value.

In Example 9, the subject matter of any one or more of Examples 1 to 8 may include, wherein the default value is 100 milliseconds.

In Example 10, the subject matter of any one or more of Examples 1 to 9 may include, wherein the touch sensor driver is to: receive a second signal from the touch sensor, the second signal indicating that the object is still touching the touchscreen; and send the event signal to the user interface manager module indicating that the object is still touching the touchscreen, the event signal causing the user interface module to increase the delay timer.

In Example 11, the subject matter of any one or more of Examples 1 to 10 may include, wherein to set the delay timer, the touch sensor driver is to: determine whether a location of the contact point is away from a screen edge of the touchscreen; and when the location is away from the screen edge, send the event signal to the user interface manager module indicating that location of the contact point is away from the screen edge of the touchscreen, the event signal causing the user interface module to set the delay timer.

In Example 12, the subject matter of any one or more of Examples 1 to 11 may include, wherein the user interface action is one of a screen rotation, an auto-hide function, or an auto-scroll function.

Example 13 includes subject matter for controlling a touchscreen user interface (such as a method, means for performing acts, machine readable medium including instructions that when performed by a machine cause the machine to performs acts, or an apparatus configured to perform) comprising: receiving at a mobile device an event signal indicating that a user interface action has been initiated; accessing a delay timer for the user interface action, the delay timer set based on events received by at least one of: a proximity sensor driver or a touch sensor driver; and executing the user interface action when the delay timer is expired.

In Example 14, the subject matter of Example 13 may include, wherein setting the delay timer by the proximity sensor driver comprises: receiving a signal from a proximity sensor, the signal indicating that an object is proximate to a touchscreen of the mobile device; and sending the event signal to set the delay timer to a default value.

In Example 15, the subject matter of any one or more of Examples 13 to 14 may include, wherein the default value is 100 milliseconds.

In Example 16, the subject matter of any one or more of Examples 13 to 15 may include, receiving a second signal from the proximity sensor, the second signal indicating that the object is still proximate to the touchscreen; and sending the event signal to increase the delay timer.

In Example 17, the subject matter of any one or more of Examples 13 to 16 may include, wherein setting the delay timer by the proximity sensor driver comprises: determining whether a distance from the object to the touchscreen is less than a preset value; determining whether a location of the object is away from a screen edge of the touchscreen; and when the distance is less than the preset value and the location is away from the screen edge, sending the event signal to set the delay timer.

In Example 18, the subject matter of any one or more of Examples 13 to 17 may include, wherein the proximity sensor is the touchscreen.

In Example 19, the subject matter of any one or more of Examples 13 to 18 may include, wherein the proximity sensor is one of an electrical sensor, an optical sensor, a magnetic sensor, or a sonar sensor.

In Example 20, the subject matter of any one or more of Examples 13 to 19 may include, wherein setting the delay timer by the touch sensor driver comprises: receiving a signal from a touch sensor, the signal indicating that an object is touching a touchscreen of the mobile device at a contact point; and sending the event signal to set the delay timer to a default value.

In Example 21, the subject matter of any one or more of Examples 13 to 20 may include, wherein the default value is 100 milliseconds.

In Example 22, the subject matter of any one or more of Examples 13 to 21 may include, receiving a second signal from the touch sensor, the second signal indicating that the object is still touching the touchscreen; and sending the event signal to increase the delay timer.

In Example 23, the subject matter of any one or more of Examples 13 to 22 may include, wherein setting the delay timer by the touch sensor driver comprises: determining whether a location of the contact point is away from a screen edge of the touchscreen; and when the location is away from the screen edge, sending the event signal to set the delay timer.

In Example 24, the subject matter of any one or more of Examples 13 to 23 may include, wherein the user interface action is one of a screen rotation, an auto-hide function, or an auto-scroll function.

Example 25 includes a machine-readable medium including instructions for controlling a touchscreen user interface, which when executed by a machine, cause the machine to perform operations of any of the Examples 1-24.

Example 26 includes an apparatus comprising means for performing any of the Examples 1-24.

Example 27 includes an apparatus comprising: means for receiving at a mobile device an event signal indicating that a user interface action has been initiated; means for accessing a delay timer for the user interface action, the delay timer set based on events received by at least one of: a proximity sensor driver or a touch sensor driver; and means for executing the user interface action when the delay timer is expired.

In Example 28, the subject matter of Example 27 may include, means for receiving at a mobile device an event signal indicating that a user interface action has been initiated; means for accessing a delay timer for the user interface action, the delay timer set based on events received by at least one of: a proximity sensor driver or a touch sensor driver; and means for executing the user interface action when the delay timer is expired.

In Example 29, the subject matter of any one or more of Examples 27 to 28 may include, wherein the means for setting the delay timer by the proximity sensor driver comprises: means for receiving a signal from a proximity sensor, the signal indicating that an object is proximate to a touchscreen of the mobile device; and means for sending the event signal to set the delay timer to a default value.

In Example 30, the subject matter of any one or more of Examples 27 to 29 may include, wherein the default value is 100 milliseconds.

In Example 31, the subject matter of any one or more of Examples 27 to 30 may include, means for receiving a second signal from the proximity sensor, the second signal indicating that the object is still proximate to the touchscreen; and means for sending the event signal to increase the delay timer.

In Example 32, the subject matter of any one or more of Examples 27 to 31 may include, wherein the means for setting the delay timer by the proximity sensor driver comprises: means for determining whether a distance from the object to the touchscreen is less than a preset value; means for determining whether a location of the object is away from a screen edge of the touchscreen; and means for when the distance is less than the preset value and the location is away from the screen edge, sending the event signal to set the delay timer.

In Example 33, the subject matter of any one or more of Examples 27 to 32 may include, wherein the proximity sensor is the touchscreen.

In Example 34, the subject matter of any one or more of Examples 27 to 33 may include, wherein the proximity sensor is one of an electrical sensor, an optical sensor, a magnetic sensor, or a sonar sensor.

In Example 35, the subject matter of any one or more of Examples 27 to 34 may include, wherein the means for setting the delay timer by the touch sensor driver comprises: means for receiving a signal from a touch sensor, the signal indicating that an object is touching a touchscreen of the mobile device at a contact point; and means for sending the event signal to set the delay timer to a default value.

In Example 36, the subject matter of any one or more of Examples 27 to 35 may include, wherein the default value is 100 milliseconds.

In Example 37, the subject matter of any one or more of Examples 27 to 36 may include, means for receiving a second signal from the touch sensor, the second signal indicating that the object is still touching the touchscreen; and means for sending the event signal to increase the delay timer.

In Example 38, the subject matter of any one or more of Examples 27 to 37 may include, wherein the means for setting the delay timer by the touch sensor driver comprises: means for determining whether a location of the contact point is away from a screen edge of the touchscreen; and means for when the location is away from the screen edge, sending the event signal to set the delay timer.

In Example 39, the subject matter of any one or more of Examples 27 to 38 may include, wherein the user interface action is one of a screen rotation, an auto-hide function, or an auto-scroll function.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for controlling a touchscreen user interface, the system comprising:
    a user interface manager circuit to:
        receive an event signal indicating that a user interface action has been initiated;
        access a delay timer for the user interface action, the delay timer set based on events received by at least one of: a proximity sensor driver or a touch sensor driver, wherein the delay timer is set in response to at least one of: a determination by the proximity sensor driver that a location of an object is away from a screen edge of a touchscreen of the system, or a determination by the touch sensor driver that the object is touching the touchscreen outside of the screen edge of the touchscreen; and
        execute the user interface action when the delay timer is expired,
    wherein to set the delay timer, the proximity sensor driver is to send the event signal to the user interface manager circuit indicating that the object is proximate to the touchscreen, the event signal causing the user interface manager circuit to set the delay timer to a default value, and
    wherein the delay timer is increased when the location of the object is still proximate to the touchscreen at a later time and away from the screen edge of the touchscreen at the later time.

2. The system of claim 1, wherein the default value is 100 milliseconds.

3. The system of claim 1, wherein to set the delay timer, the proximity sensor driver is to:
    determine whether a distance from the object to the touchscreen is less than a preset value; and
    when the distance is less than the preset value, send the event signal to the user interface manager circuit indicating that the distance of the object is less than the preset value, the event signal causing the user interface manager circuit to set the delay timer.

4. The system of claim 1, wherein the proximity sensor is incorporated into the touchscreen.

5. The system of claim 1, wherein the proximity sensor is one of an electrical sensor, an optical sensor, a magnetic sensor, or a sonar sensor.

6. The system of claim 1, wherein to set the delay timer, the touch sensor driver is to:
    send the event signal to the user interface manager circuit indicating that the object is touching the touchscreen, the event signal causing the user interface manager circuit to set the delay timer to a second default value.

7. The system of claim 6, wherein the second default value is 100 milliseconds.

8. The system of claim 6, wherein the touch sensor driver is to:
    receive a second signal from the touch sensor, the second signal from the touch sensor indicating that the object is still touching the touchscreen;
    determine whether the object is still touching the touchscreen outside of the screen edge of the touchscreen; and send the event signal to the user interface manager circuit indicating that the object is still touching the touchscreen, the event signal causing the user interface manager circuit to increase the delay timer, wherein the delay timer is increased in response to a determination by the touch sensor driver that the object is still touching the touchscreen outside of the screen edge of the touchscreen.

9. The system of claim 1, wherein the user interface action is one of a screen rotation, an auto-hide function, or an auto-scroll function.

10. The system of claim 1, wherein the proximity sensor is incorporated into the system.

11. The system of claim 1, wherein the touchscreen is incorporated into the system.

12. A system for controlling a touchscreen user interface, the system comprising:
- a proximity sensor driver to interface with a proximity sensor;
- a touch sensor driver to interface with a touchscreen; and
- a user interface manager circuit to:
  - receive an event signal indicating that a user interface action has been initiated;
  - set a delay timer to a default value;
  - access a delay timer for the user interface action, the delay timer set to a default value, and the delay timer activated based on events received by at least one of: the proximity sensor driver or the touch sensor driver, wherein the delay timer is set in response to at least one of: a determination by the proximity sensor driver that a location of an object is away from a screen edge of a touchscreen of the system, or a determination by the touch sensor driver that the object is touching the touchscreen outside of the screen edge of the touchscreen;
  - increase the delay timer when, at a later time, the location of the object is still proximate to the touchscreen and away from the screen edge of the touchscreen; and
  - execute the user interface action when the delay timer is expired.

13. The system of claim 12, wherein to set the delay timer, the proximity sensor driver is to:
- determine whether a distance from the object to the touchscreen is less than a preset value; and
- when the distance is less than the preset value, send the event signal to the user interface manager circuit indicating that the distance of the object is less than the preset value, the event signal causing the user interface manager circuit to set the delay timer.

14. The system of claim 12, wherein to set the delay timer, the touch sensor driver is to:
- send the event signal to the user interface manager circuit indicating that the object is touching the touchscreen, the event signal causing the user interface manager circuit to set the delay timer to a second default value.

15. The system of claim 14, wherein the touch sensor driver is to:
- receive a second signal from the touch sensor, the second signal from the touch sensor indicating that the object is still touching the touchscreen;
- determine whether the object is still touching the touchscreen outside of the screen edge of the touchscreen; and
- send the event signal to the user interface manager circuit indicating that the object is still touching the touchscreen, the event signal causing the user interface manager circuit to increase the delay timer, wherein the delay timer is increased in response to a determination by the touch sensor driver that the object is still touching the touchscreen outside of the screen edge of the touchscreen.

16. The system of claim 12, wherein the user interface action is one of a screen rotation, an auto-hide function, or an auto-scroll function.

17. A non-transitory machine-readable medium including instructions for controlling a touchscreen user interface of a mobile device, which when executed by the mobile device, cause the mobile device to:
- determine, using a proximity sensor driver, whether a location of an object is away from a screen edge of the touchscreen;
- determine, using a touch sensor driver, whether the object is touching the touchscreen outside of the screen edge of the touchscreen;
- receive at the mobile device an event signal indicating that a user interface action as been initiated;
- access a delay timer for the user interface action, the delay timer set to a default value, and the delay timer activated based on events received by at least one of: the proximity sensor driver or the touch sensor driver, wherein the delay timer is set in response to at least one of: a determination by the proximity sensor driver that a location of an object is away from a screen edge of a touchscreen of the system, or a determination by the touch sensor driver that the object is touching the touchscreen outside of the screen edge of the touchscreen;
- increase the delay timer when, at a later time, the location of the object is still proximate to the touchscreen and away from the screen edge of the touchscreen; and
- execute the user interface action when the delay timer is expired.

18. The non-transitory machine-readable medium of claim 17, further comprising instructions to set the delay timer by:
- determining whether a distance from the object to the touchscreen is less than a preset value; and
- when the distance is less than the preset value, sending the event signal indicating that the distance of the object is less than the preset value, the event signal causing the delay timer to be set to the default value.

19. The non-transitory machine-readable medium of claim 17, further comprising instructions to set the delay timer by:
- sending the event signal indicating that the object is touching the touchscreen, the event signal causing the delay timer to be set to a second default value.

20. The non-transitory machine-readable medium of claim 19, further comprising instructions to:
- receive a signal from a touch sensor at the touch sensor driver, the signal from the touch sensor indicating that the object is still touching the touchscreen;
- determine whether the object is still touching the touchscreen within a threshold distance of the screen edge of the touchscreen; and
- send the event signal indicating that the object is still touching the touchscreen, the event signal causing an increase of the delay timer, wherein the delay timer is increased in response to a determination that the object is still touching the touchscreen within the threshold distance of the screen edge of the touchscreen.

* * * * *

UNITED STATES PATENT AND TRADEMARK OFFICE
CERTIFICATE OF CORRECTION

PATENT NO. : 10,152,220 B2
APPLICATION NO. : 15/677872
DATED : December 11, 2018
INVENTOR(S) : Kaining Yuan

Page 1 of 1

It is certified that error appears in the above-identified patent and that said Letters Patent is hereby corrected as shown below:

In the Claims

In Column 16, Line 21, in Claim 17, delete "as" and insert --has-- therefor

Signed and Sealed this
Twenty-first Day of April, 2020

Andrei Iancu
*Director of the United States Patent and Trademark Office*